Figure 1:
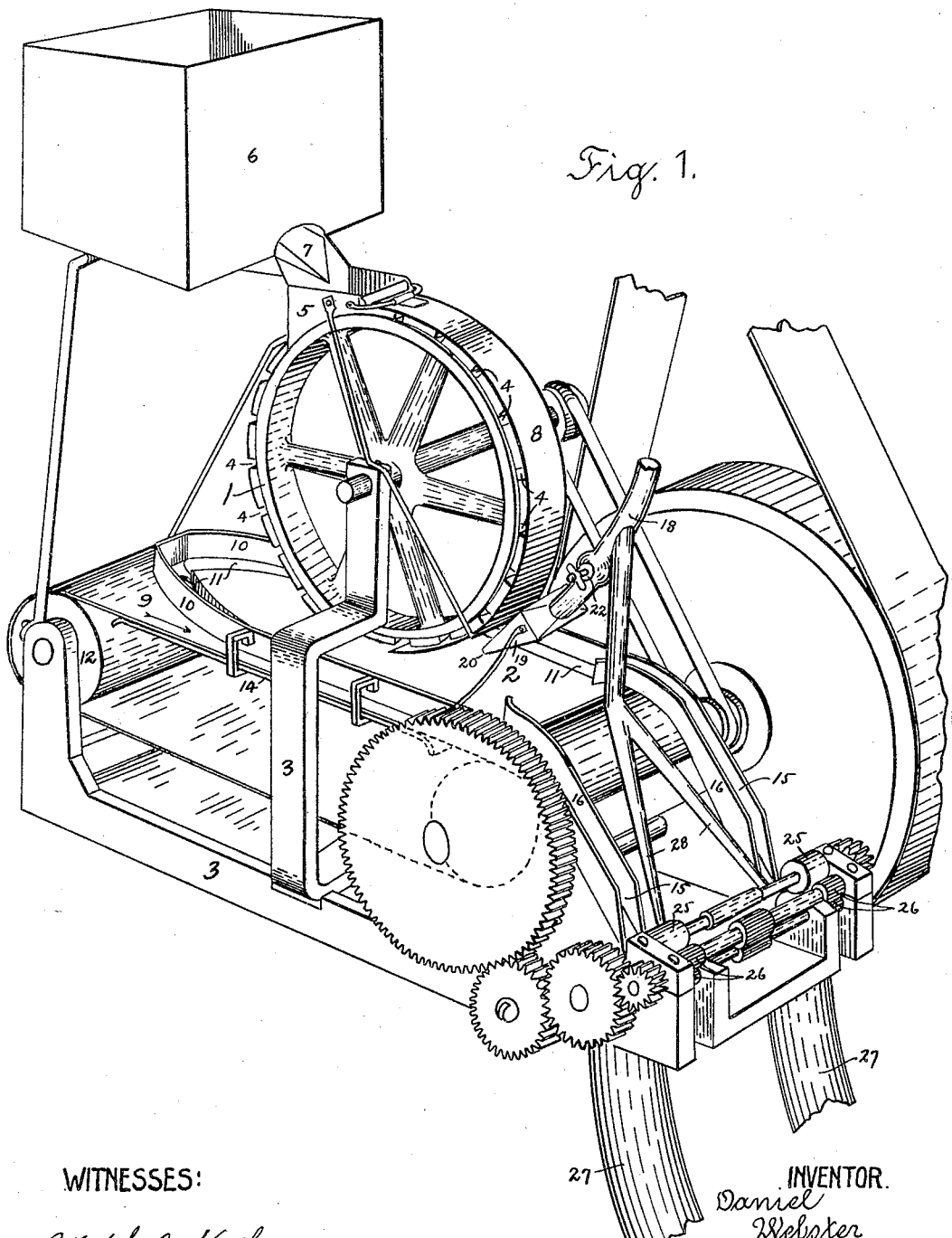

No. 770,794. PATENTED SEPT. 27, 1904.
D. W. BROWN.
OAT HULLING PROCESS.
APPLICATION FILED NOV. 19, 1903.
NO MODEL. 2 SHEETS—SHEET 1.

WITNESSES:
Joseph J. Stosler.
Euphrasia Henry

INVENTOR.
Daniel Webster Brown.
BY Harry Frease
ATTORNEY

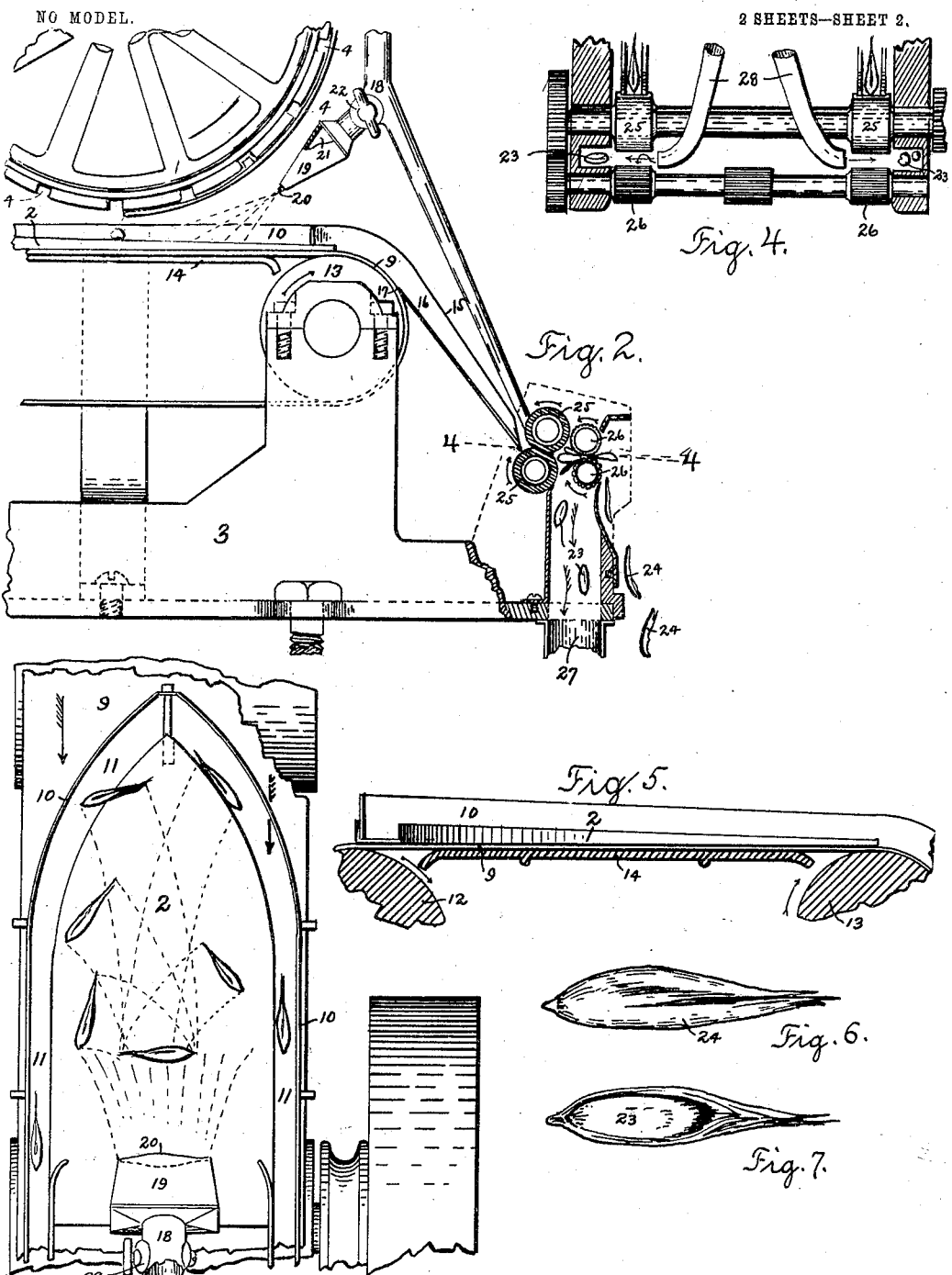

No. 770,794.

Patented September 27, 1904.

UNITED STATES PATENT OFFICE.

DANIEL WEBSTER BROWN, OF AKRON, OHIO, ASSIGNOR OF ONE-HALF TO ERNEST C. DEIBEL, OF AKRON, OHIO.

OAT-HULLING PROCESS.

SPECIFICATION forming part of Letters Patent No. 770,794, dated September 27, 1904.

Application filed November 19, 1903. Serial No. 181,749. (No model.)

*To all whom it may concern:*

Be it known that I, DANIEL WEBSTER BROWN, a citizen of the United States, residing at Akron, in the county of Summit and State of Ohio, have invented a new and useful Oat-Hulling Process, of which the following is a specification.

In hulling oats for milling the berry or for other purposes the present practice is to thoroughly dry the grains in pans and then grind them between two adjacent ordinary millstones, whereby the hull is crushed and broken and the berry is often bruised, sometimes broken, and frequently lost with the hull-chaff, after which the berry is separated from the chaff by means of screens and blowers, by which method it is impossible to entirely free the berry of the smaller particles of chaff which consequently enter as an objectionable element into the various oat-berry products.

This invention relates to a process for removing the hull from the berry of an oat or other similar grain by arranging the grains endwise alike and passing them stem first between rolls, whereby the berry is squeezed out of the open or free end of the hull; and the object of the invention is to completely separate the berry from the oat-hull without any preliminary artificial drying or subsequent screening and blowing and without affecting the berry in any way.

For the purpose of describing this process reference is had to the accompanying drawings, which illustrate a preferred form of apparatus and mechanism for carrying it into effect, and in which—

Figure 1 is a perspective view of the entire apparatus; Fig. 2, a side elevation with part in section, showing the method of arranging, conveying, and hulling the oat-grains; Fig. 3, a plan view of the blast-plate and adjoining parts, showing the method of arranging and conveying the grains; Fig. 4, a horizontal section on line 4 4, Fig. 2, showing the lower feed and hulling rolls and the berry-blast pipes; Fig. 5, a side elevation of the blast-plate and adjoining parts; Fig. 6, an enlarged side view of an oat-grain, and Fig. 7 an enlarged longitudinal section of the same.

Similar numerals refer to similar parts throughout the drawings.

The feed-wheel 1 is mounted on a transverse shaft above the blast-plate 2 in the frame 3 of the machine, and in the periphery of the wheel is provided the series of transverse channels 4, each one of which channels is adapted to freely receive one large oat-grain lying lengthwise therein. The hopper 5 is located on the upper side of the feed-wheel, the periphery of the wheel forming the bottom of the hopper, and the feed-box 6 is provided with the spout 7, leading into the hopper. The shield 8 extends from the end of the hopper closely around the periphery of the feed-wheel in the direction of its rotation and terminates at or near the middle of the under side. The oat-grains are run slowly into the hopper and find their way into the transverse grooves of the feed-wheel, by the rotation of which they are carried downward, being retained in the grooves by the shield until they pass its lower end, when they drop onto the blast-plate in the transverse position given to them by the feed-wheel grooves.

The blast-plate 2 is preferably made quite smooth on its upper surface and is shaped as a Gothic window with its apex to the rear with reference to the travel of the conveyer-belt 9, as indicated by arrows in the drawings, and the rear end of this plate is preferably formed thicker than the forward end, which gives the upper surface a slight inclination upward from front to rear. The rim-strips 10 are located substantially parallel with and at an interval preferably less than the length of the smallest grains from the side edges of the blast-plate, thus forming the conveying-channels 11, of which channels the conveyer-belt forms the bottom. The conveyer-belt is mounted on the drums 12 and 13, and the upper section of the belt is arranged to travel closely against the under side of the blast-plate and the lower edges of the rim-strips, and, if necessary, the sustaining-plate 14 is provided to hold the belt up in this place. The rim-strips 10 are extended with the conveyer-belt around the forward drum and form the outer sides of the inclined chutes 15, which extend forward and downward from the front side of this drum. The inner sides 16 of these chutes overlap the forward end of the blast-plate and are continuous with its side edges, and the rear edges 17 of the bottoms of the chutes are beveled to neatly fit against the conveyer-belt.

The blast-pipe 18 is located in front of the feed-wheel and is provided with the nozzle 19, having the transversely-elongated mouth 20, which mouth preferably has a greater opening in the middle than at the sides. The nozzle is also somewhat enlarged at its juncture with the pipe to form the considerable cavity 21, which acts to soften the blast from the nozzle, the strength of which blast is further regulated by the valve 22 in the pipe. The nozzle 19 is preferably located and directed to discharge the blast rearward and downward against the blast-plate at a point a short distance in front of where the oat-grains drop from the feed-wheel. By reason of the shape of the nozzle the greater volume of the blast strikes the middle part of the blast-plate and a lesser volume spreads out and covers the entire plate from side to side.

As the respective oat-grains drop onto the blast-plate in the transverse position they are caught broadside by the blast and carried rearward or sidewise on the plate. The oat-berry 23 being located almost entirely in the stem end of the hull 24, this end of the oat-grain is quite a little heavier than the open or free end, whereby the stem end is retarded, and the action of the blast always rolls or slides the oat-grain over the side edges of the blast-plate into the conveying-channel with the stem end directed forward, as shown in Fig. 3. The conveyer-belt then carries the grains forward in the conveying-channels stem first and discharges them into the inclined chutes.

The pair of rubber-faced feed-rolls 25 is transversely mounted at the lower ends of the chutes and are preferably made smooth and adjusted to compress each other, and thus form quite an extended surface of contact to better control the oat-grains. The pair of comparatively non-elastic hulling-rolls 26 is transversely mounted in front of the feed-rolls, the upper hulling-roll being preferably located quite closely to the upper feed-roll and the lower rolls at an interval from each other about the length of a large oat-berry. The hulling-rolls are preferably grooved or roughened to increase their adhesive action, and they are located near enough together to firmly grip an oat-hull, but preferably without cutting it.

As each oat-grain descends the chute its stem end enters between the feed-rolls, which being elastic carry it forward without crushing or injury and feed it stem first between the hulling-rolls, which grip the stem of the hull and carry it forward between the rolls, and by this operation the oat-berry is squeezed out of the open or free end of the hull, as shown in Fig. 2. The berry is not drawn between the hulling-rolls because of its rounded shape and of the smooth surface of the inner side of the intervening hull, which slips on the berry and is stripped off of it by the action of the rolls. The berry is then free to drop down through the interval between the lower rolls into the conveyer-pipe 27, and the hull is discharged on the forward side of the hulling-rolls. To prevent any clogging of the berries in the narrow interval between the lower rolls, it is preferred to provide the berry-blast pipes 28, which are located and directed to blow preferably transversely through the space between the feed and hulling-rolls, and thus carry each berry as soon as it is discharged from its hull out to the side of the rolls into the vertical channel 28, whence it falls into the conveyer-pipe 27.

The feed-wheel, drums, and rolls are rotated in the directions indicated by arrows by power communicated by belts, pulleys, and gears, as illustrated, or by other ordinary means, and the blast is provided by a suitable blower. (Not shown.)

What I claim as my invention, and desire to secure by Letters Patent, is—

1. The process of arranging oat or similar grains endwise alike consisting of transversely positing them on a surface in the range of a blast.

2. The process of hulling oat or similar grains consisting of compressing them from the stem toward the open end in the range of a blast.

In testimony whereof I have signed my name to this specification in the presence of two subscribing witnesses.

DANIEL WEBSTER BROWN.

Witnesses:
 HARRY FREASE,
 EUPHRASIA HENRY.